US006976219B2

(12) United States Patent
Morita et al.

(10) Patent No.: US 6,976,219 B2
(45) Date of Patent: Dec. 13, 2005

(54) RIGHTS INFORMATION PROCESSING APPARATUS AND METHOD, AND PROGRAM STORING MEDIUM USING A DISPLAY OBJECT FOR ASSOCIATING WITH CONTENTS

(75) Inventors: Toshihiro Morita, Kanagawa (JP); Takayuki Kori, Kanagawa (JP); Mikiko Sakurai, Kanagawa (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 09/975,798

(22) Filed: Oct. 11, 2001

(65) Prior Publication Data

US 2002/0073070 A1    Jun. 13, 2002

(30) Foreign Application Priority Data

Oct. 12, 2000  (JP)  ............................. 2000-311802

(51) Int. Cl.[7] ............................ G06F 3/14; G06F 13/00
(52) U.S. Cl. ...................... 715/748; 715/716; 715/741; 715/835; 713/200
(58) Field of Search ............................. 345/775, 748; 705/54; 715/505, 775, 748, 716, 717, 719, 715/721, 741, 742, 835, 772, 846; 713/189, 713/191, 193, 168, 181, 200, 201

(56) References Cited

U.S. PATENT DOCUMENTS

| 5,629,980 | A | * | 5/1997 | Stefik et al. ................... 705/54 |
| 5,704,029 | A | * | 12/1997 | Wright, Jr. ................... 715/505 |
| 5,724,530 | A | * | 3/1998 | Stein et al. ................... 345/748 |
| 5,751,287 | A | * | 5/1998 | Hahn et al. ................... 345/775 |
| 5,801,700 | A | * | 9/1998 | Ferguson ...................... 345/748 |
| 5,925,127 | A | * | 7/1999 | Ahmad ........................ 713/200 |
| 6,298,446 | B1 | * | 10/2001 | Schreiber et al. ............. 713/201 |
| 6,389,538 | B1 | * | 5/2002 | Gruse et al. ............. 713/168 X |

* cited by examiner

*Primary Examiner*—Raymond J. Bayerl
(74) *Attorney, Agent, or Firm*—Oblon, Spivak, McClelland, Maier & Neustadt, P.C.

(57) ABSTRACT

A transfer processing unit reads out data relating to contents and rights information corresponding to the contents, from a memory card. A GUI unit controls display so as to display a predetermined icon corresponding to the data, in the event that the rights information indicates permission to import the contents. Thus, the user can speedily know operations permitted for the contents.

10 Claims, 10 Drawing Sheets

| MEDIA CONTENTS ID | MUSIC PIECE TITLE | EQUIPMENT ID | EQUIPMENT CONTENTS ID | NUMBER OF TIMES OF CHECK-OUT | COPY CONTROL FLAG | MUSIC PIECE DATA POINTER |
|---|---|---|---|---|---|---|
| 1 | Song-A | 0x001BA63F | 0x0083 | 0 | 1 | 0x5A00 |
| 2 | Song-B | 0x6EBD734C | 0x0003 | 3 | 2 | 0x7BC0 |
| 3 | Song-C | 0x9D712C5A | 0x00AF | 3 | 3 | 0x93F0 |

| MEDIA CONTENTS ID | MUSIC PIECE TITLE | EQUIPMENT ID | EQUIPMENT CONTENTS ID | NUMBER OF TIMES OF CHECK-OUT | FILE NAME |
|---|---|---|---|---|---|
| 1 | Song-A | 0x001BA63F | 0x0083 | 0 | F:¥My Music¥Album¥01-Song-a.omg |
| 2 | Song-B | 0x001BA63F | 0x0003 | 3 | F:¥My Music¥Album¥02-Song-b.omg |
| 3 | Song-C | 0x001BA63F | 0x00AF | 3 | F:¥My Music¥New¥01-Song-c.omg |

RIGHTS INFORMATION PROCESSING APPARATUS AND METHOD, AND PROGRAM STORING MEDIUM USING A DISPLAY OBJECT FOR ASSOCIATING WITH CONTENTS

BACKGROUND OF THE INVENTION

1. Field of the Invention

The present invention relates to an information processing apparatus and method, and program storing medium, and particularly relates to an information processing apparatus and method, and program storing medium, for operating contents.

2. Description of the Related Art

In recent years, digital technology has become commonplace, and accordingly various types of data such as music data, image data, etc., have come to be digitally recorded to and reproduced from recording media.

Now, the number of times that the data can be reproduced, the period of time within which the data can be used, etc., may be restricted based on rights information corresponding to the data, in order to protect copyrights.

Further, users can purchase various types of data such as music data, image data, etc., at terminals installed at shops which sell such various types of data, and record the data in his/her own personal computer for use thereby. With regard to data purchased at shops and so forth, according to the corresponding rights information, either moving is permitted without any restriction on the number of times, or moving is permitted for one time only, and following this moving, only check-in or check-out is permitted.

However, the user cannot tell which operations are permitted for the data, unless a dialog box or the like is not displayed.

SUMMARY OF THE INVENTION

The present invention has been made in light of the above problem, and accordingly, it is an object of the present invention to enable the user to know operations permitted for the contents in a speedy manner, without troublesome operations.

According to a first aspect of the present invention, an information processing apparatus comprises: reading control means for controlling reading out, from the recording medium, data relating to the contents and rights information corresponding to the contents; and display control means for controlling display such that a first icon is displayed corresponding to the data, in the event that the rights information indicates permission of importing of the contents.

The display control means may further control display such that a second icon is displayed corresponding to the data in the event that the rights information permits check-in of the contents, or such that a third icon is displayed corresponding to the data in the event that the rights information indicates permission of moving of the contents, or such that a fourth icon is displayed corresponding to the data in the event that the rights information indicates permission of check-in of the contents.

According to a second aspect of the present invention, an information processing method comprises: a reading control step for controlling reading out, from the recording medium, data relating to the contents and rights information corresponding to the contents; and a display control step for controlling display such that a first icon is displayed corresponding to the data, in the event that the rights information indicates permission of importing of the contents.

According to a third aspect of the present invention, a program in a program storing medium comprises: code for a reading control step for controlling reading out, from the recording medium, data relating to the contents and rights information corresponding to the contents; and code for a display control step for controlling display such that a first icon is displayed corresponding to the data, in the event that the rights information indicates permission of importing of the contents.

With the information processing apparatus according to the first aspect, the information processing method according to the second aspect, and the program storing medium according to the third aspect, reading of data relating to contents and rights information corresponding to contents from a recording medium is controlled, and in the event that the rights information indicates permission to import contents, display is controlled so as to display a first icon, corresponding to the data.

DESCRIPTION OF THE PREFERRED EMBODIMENTS

Figure 1:
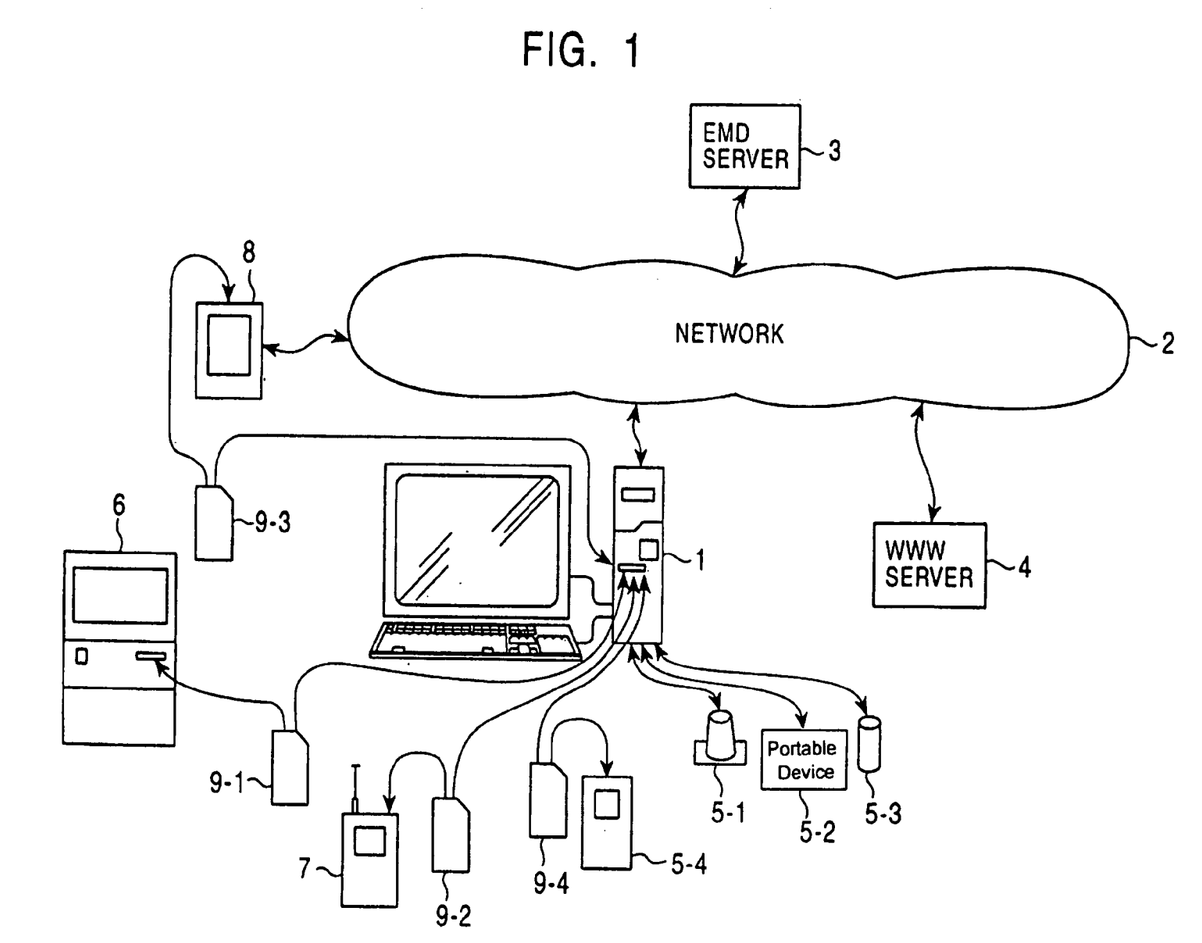
FIG. 1 is a diagram illustrating an embodiment of the contents data managing system according to the present invention.

FIG. 1 is a diagram illustrating an embodiment of the contents data managing system according to the present invention. A personal computer 1 is connected to a network 2 comprising a Local Area Network, the Internet, or the like. The personal computer 1 takes music data received from an EMD (Electrical Music Distribution) server 3 or read from a CD (Compact Disk) (such music data will hereafter be referred to as "contents") and either records the contents as such, or converts the contents into a predetermined encoded format (e.g., ATRAC3 (Registered Trademark)) and also encrypts the contents with an encrypting format such as DES (Data Encryption Standard) and then records the contents.

The personal computer 1 records rights information indicating usage conditions of the contents, corresponding to the contents recorded in plaintext or as enciphered data.

The rights information indicates, for example, the number of portable devices (hereafter also referred to as simply "PD") which can simultaneously use the contents corresponding to the rights information (the number of PDs which can check-out, as described later). Even in the event that there has been check-out of the contents to the number of times indicated in the rights information, the personal computer 1 is capable of playing the contents.

Also, the rights information indicates that the contents can be copied. In the event that the contents are copied to the portable devices 5-1 through 5-3, the personal computer 1 is still capable of playing the contents recorded therein. The number of times that the contents can be recorded to the portable devices 5-1 through 5-3 may be restricted. In this case, the number of times that copies can be made never increases.

Also, the rights information indicates whether the contents can be moved to another personal computer, and so forth. After the contents are moved to the portable devices 5-1 through 5-3, the contents recorded in the personal computer 1 cannot be used any more (either the contents are deleted, or the rights information is changed so that the contents are no longer usable).

Or, the rights information indicates that, following moving the contents from a recording medium to the personal computer 1, only check-out or check-in is permitted (so-called importing). Contents imported from memory cards 9-1 through 9-4 to the personal computer 1 are permitted to be, for example, checked-out to the portable devices 5-1 through 5-3, but moving the contents to another personal computer or the memory cards 9-1 through 9-4 is not permitted.

Details of rights information will be described later.

The personal computer 1 stores the contents which are recorded in an encrypted state along with the data relating to the contents (i.e., music piece title, playing conditions, etc.) to the portable device 5-1 that is connected thereto via a USB (Universal Serial Bus) cable, and also updates the rights information corresponding to the stored contents in accordance with the storing of the contents in the portable device 5-1 (hereafter referred to as "check-out"). More specifically, in the event of check-out, the number of times that check-out can be performed in the rights information corresponding to the contents recorded in the personal computer 1 is decremented by 1. When the number of times that check-out can be made reaches zero, the corresponding contents cannot be checked-out.

The personal computer 1 stores the contents which are recorded in an encrypted state along with the data relating to the contents to the portable device 5-2 that is connected thereto via a USB cable, and also updates the rights information corresponding to the stored contents in accordance with the storing of the contents in the portable device 5-2. The personal computer 1 stores the contents which are recorded in an encrypted state along with the data relating to the contents to the portable device 5-3 that is connected thereto via a USB cable, and also updates the rights information corresponding to the stored contents in accordance with the storing of the contents in the portable device 5-3.

Also, the personal computer 1 causes the portable device 5-1 connected thereto via a USB cable to delete (or render unusable) the contents which the personal computer 1 has checked-out to the portable device 5-1, and updates the rights information corresponding to the deleted contents (hereafter referred to as "check-in"). More specifically, at the time of check-in, the number of times that check-out can be performed in the rights information corresponding to the contents recorded in the personal computer 1 is incremented by 1.

The personal computer 1 causes the portable device 5-2 connected thereto via a USB cable to delete (or render unusable) the contents which the personal computer 1 has checked-out to the portable device 5-2, and updates the rights information corresponding to the deleted contents. The personal computer 1 causes the portable device 5-3 connected thereto via a USB cable to delete (or render unusable) the contents which the personal computer 1 has checked-out to the portable device 5-3, and updates the rights information corresponding to the deleted contents.

The personal computer 1 cannot check-in contents checked-out to the portable device 5-1 by another personal computer not shown in the drawings. The personal computer 1 cannot check-in contents checked-out to the portable device 5-2 by another personal computer. The personal computer 1 cannot check-in contents checked-out to the portable device 5-3 by another personal computer.

In response to a request from the personal computer 1, the EMD server 3 supplies contents to the personal computer along with data relating to the contents (e.g., music piece title, playing restrictions, etc.), via the network 2.

The contents which the EMD server 3 supplies are encoded by a predetermined encoding method, and encrypted with a predetermined encryption method. The EMD server 3 supplies a key for deciphering the contents to the personal computer 1.

In response to a request of the personal computer 1, a WWW (World Wide Web) server 4 supplies data corresponding to a CD from which contents are read (e.g., CD album title, CD record company, etc.) and data corresponding to the contents read from a CD (e.g., music piece title, name of composer, etc.), to the personal computer 1.

The portable device 5-1 stores the contents supplied from the personal computer 1 (i.e., check-out contents, etc.) along with data relating to contents (e.g., music piece title, rights information, etc.). The portable device 5-1 plays the stored contents based on the data relating to the contents, and outputs the contents to an unshown headphone set or the like.

For example, in the event that a user attempts to play contents a number of times exceeding the number of playing times described in the rights information stored as data relating to the contents, the portable device 5-1 stops playing of the corresponding contents. In the event that a user attempts to play contents after expiration of the playing period described in the rights information stored as data relating to the contents, the portable device 5-1 stops playing of the corresponding contents.

The user can remove the portable device 5-1 storing the contents from the personal computer 1 carry the portable device 5-1, and further play the contents stored therein so that music or the like corresponding to the contents can be listened to through the headphones or the like.

The portable device 5-2 stores the contents supplied from the personal computer 1 along with data relating to contents. The portable device 5-2 plays the stored contents based on the data relating to the contents, and outputs the contents to an unshown headphone set or the like. The user can remove the portable device 5-2 storing the contents from the personal computer 1 carry the portable device 5-2, and further play the contents stored therein so that music or the like corresponding to the contents can be listened to through the headphones or the like.

The portable device 5-3 stores the contents supplied from the personal computer 1 along with data relating to contents. The portable device 5-3 plays the stored contents based on the data relating to the contents, and outputs the contents to an unshown headphone set or the like. The user can remove the portable device 5-3 storing the contents from the personal computer 1 carry the portable device 5-3, and further play the contents stored therein so that music or the like corresponding to the contents can be listened to through the headphones or the like.

The memory card 9-1 is inserted into a terminal device 6 installed at a shop or the like, and contents which the user has purchased by operating the terminal device 6 are stored therein along with corresponding rights information. The predetermined contents stored in the memory card 9-1 are permitted to be imported based on the rights information, and moving thereof is not permitted.

The memory card 9-1 storing the contents is mounted in a slot in the personal computer 1. The personal computer 1 imports the contents stored in the memory card 9-1 mounted thereto. The personal computer 1 generates rights information permitting only check-in or check-out corresponding to the imported contents, and stores the generated rights information. The contents imported to the personal computer 1 are permitted for check-out to the portable devices 5-1 through 5-3, or permitted for check-in from the portable devices 5-1 through 5-3, based on the rights information.

The memory card 9-2 is inserted into a cellular telephone 7, and contents which the user has purchased by operating the cellular telephone 7 (e.g., contents downloaded via a cellular telephone line) are stored therein along with corresponding rights information. The predetermined contents stored in the memory card 9-2 are permitted to be imported based on the rights information, and moving thereof is not permitted.

The memory card 9-2 storing the contents is mounted in a slot in the personal computer 1. The personal computer 1 imports the contents stored in the memory card 9-2 mounted thereto. The personal computer 1 generates rights information permitting only check-in or check-out corresponding to the imported contents, and stores the generated rights information.

The memory card 9-3 is inserted into a PDA (Personal Digital Assistant) 8, and contents which the user has purchased from an EMD server 3 for example via a network 2 by operating the PDA 8 are stored therein along with corresponding rights information. The predetermined contents stored in the memory card 9-3 are permitted to be imported based on the rights information, and moving thereof is not permitted.

The memory card 9-3 storing the contents is mounted in a slot in the personal computer 1. The personal computer 1 imports the contents stored in the memory card 9-3 mounted thereto. The personal computer 1 generates rights information permitting only check-in or check-out corresponding to the imported contents, and stores the generated rights information.

The memory card 9-4 is inserted into a portable device 5-4 with recording functions, and contents which the user has recorded by operating the portable device 5-4 are stored therein along with rights information generated in a corresponding manner. The predetermined contents stored in the memory card 9-4 are permitted to be imported based on the rights information, and moving thereof is not permitted.

The memory card 9-4 storing the contents is mounted in a slot in the personal computer 1. The personal computer 1 imports the contents stored in the memory card 9-4 mounted thereto. The personal computer 1 generates rights information permitting only check-in or check-out corresponding to the imported contents, and stores the generated rights information.

In the following description, the portable devices 5-1 through 5-4 will be referred to simply as portable device 5, unless there is the need to distinguish between the individual portable devices 5-1 through 5-4, and the memory cards 9-1 through 9-4 will be referred to simply as memory card 9, unless there is the need to distinguish between the individual memory cards 9-1 through 9-4.

Figure 2:
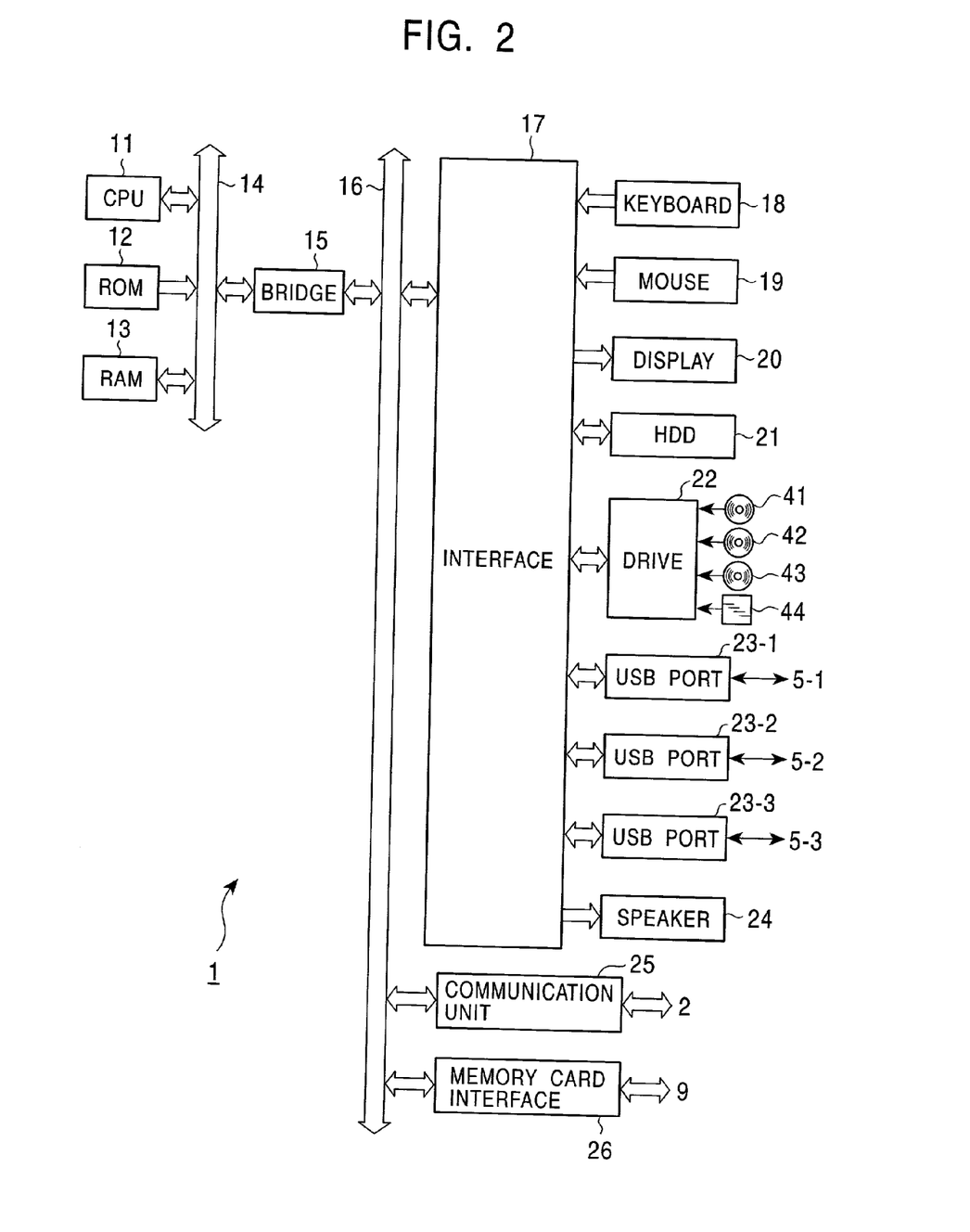
FIG. 2 is a block diagram describing the configuration of the personal computer 1.

FIG. 2 is a diagram describing the configuration of the personal computer 1. A CPU (Central Processing Unit) 11 performs the actual execution of various application programs for realizing the later-described functions and the Operating System. ROM (Read-Only Memory) 12 generally stores, of the programs used by the CPU 11 and parameters used for computation, the fixed data. RAM (Random-Access Memory) 13 stores programs used for executing by the CPU 11 and parameters which change according to the execution thereof. These are mutually connected by a host bus 14 configured of a CPU bus or the like.

The host bus 14 is connected to an external bus 16 such as a PCI (Peripheral Component Interconnect/Interface) bus or the like via a bridge 15.

A keyboard 18 is operated by the user when inputting various instructions to the CPU 11. A mouse 19 is operated by the user when pointing instructions or selections on the screen shown on a display 20. The display 20 comprises a liquid crystal display device or CRT (Cathode Ray Tube) or the like, for displaying various types of information in text and images. A HDD (Hard Disk Drive) 21 drives hard disks, and records programs to be executed by the CPU 11 and information therein and reproduces the programs and information therefrom.

A drive 22 reads out data or programs recorded on magnetic disks 41, optical disks (including CDs) 42, magneto-optical disks 43, or semiconductor memory 44, which are mounted as necessary, and supplies the data or programs to RAM 13 which is connected thereto via an interface 17, the external bus 16, the bridge 15, and the host bus 14.

The portable device 5-1 is connected to the USB port 23-1 via a USB cable. The USB port 23-1 outputs to the portable device 5-1 data (e.g., contents, commands for the portable device 5-1, and so forth) supplied from the CPU 11, RAM 13, or HDD 21, to the respective removable disk devices 3-1 through 3-3, via the interface 17, external bus 16, bridge 15, or host bus 14.

The portable device 5-2 is connected to the USB port 23-2 via a USB cable. The USB port 23-2 outputs to the portable device 5-2 data (e.g., contents, commands for the portable device 5-2, and so forth) supplied from the CPU 11, RAM 13, or HDD 21, to the respective removable disk devices 3-1 through 3-3, via the interface 17, external bus 16, bridge 15, or host bus 14.

The portable device 5-3 is connected to the USB port 23-3 via a USB cable. The USB port 23-3 outputs to the portable device 5-3 data (e.g., contents, commands for the portable device 5-3, and so forth) supplied from the CPU 11, RAM 13, or HDD 21, to the respective removable disk devices 3-1 through 3-3, via the interface 17, external bus 16, bridge 15, or host bus 14.

A speaker 24 outputs predetermined audio corresponding to contents, based on audio signals supplied from the interface 17.

The keyboard 18, mouse 19, display 20, HDD 21, drive 22, USB ports 23-1 through 23-3, and speaker 24, are connected to the interface 17, and the interface 17 is connected to the CPU 11 via the external bus 16, bridge 15, and host bus 14.

A communication unit 25 has a network 2 connected thereto, for storing data supplied from the CPU 11 or HDD 21 (e.g., a request for transmitting contents) in packets of a predetermined format which are then transmitted via the network 2, and also for outputting data (e.g., contents, etc.) stored in packets received via the network 2 to the CPU 11, RAM 13, or HDD 21.

A memory card interface 26 reads out contents and corresponding rights information stored in the memory card 9 mounted to the personal computer 1, supplies the contents and the rights information to the CPU 11, RAM 13, or HDD 21, and also stores data supplied from the CPU 11, RAM 13, or HDD 21 to the memory card 9.

The communication unit 25 and the memory card interface 26 are connected to the CPU 11 via the external bus 16, bridge 15, and host bus 14.

In the following description, the USB ports 23-1 through 23-3 will be referred to simply as USB port 23, unless there is the need to distinguish between the individual USB ports 23-1 through 23-3.

Figure 3:
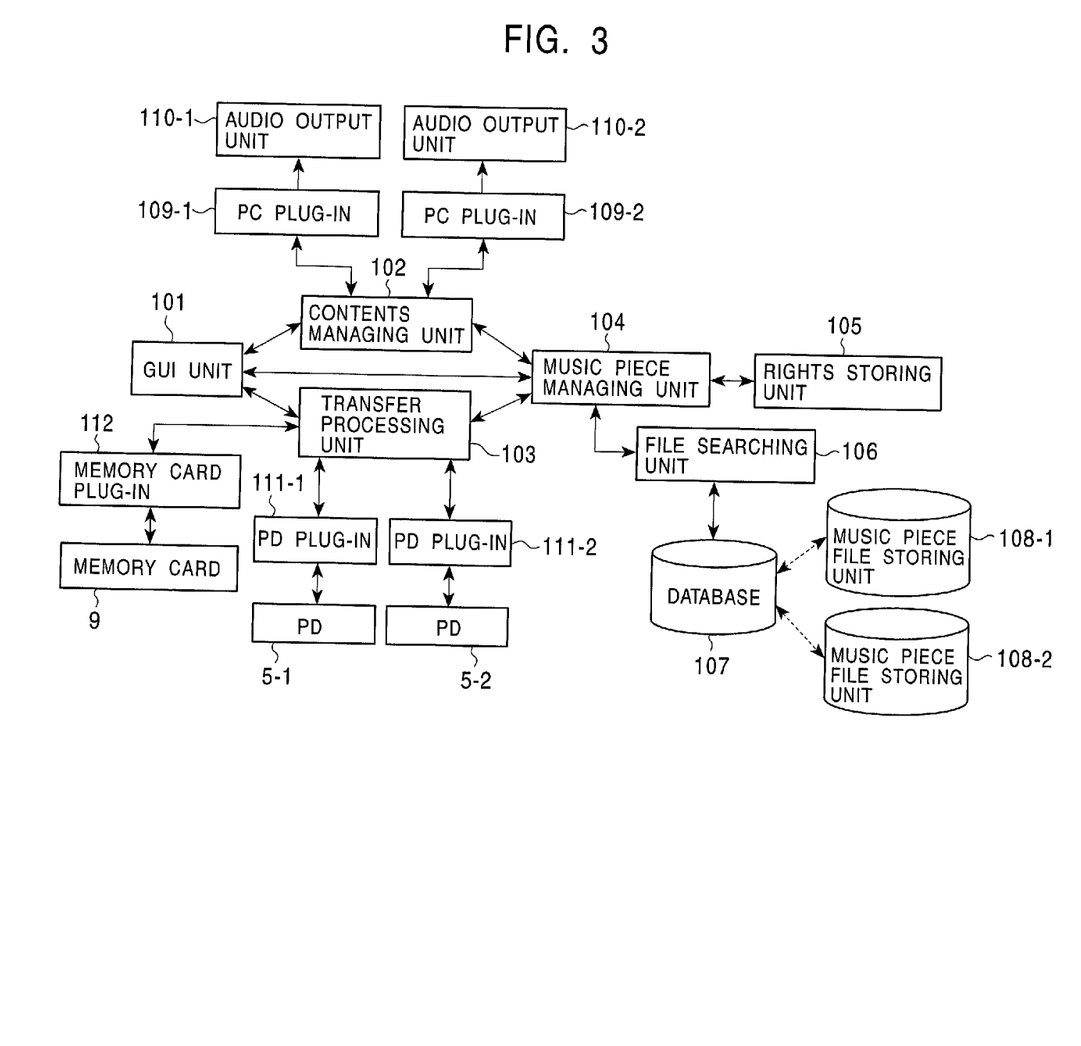
FIG. 3 is a block diagram describing the functions of the personal computer 1.

FIG. 3 is a block diagram illustrating the functions of the personal computer 1 realized by the CPU 11 executing a contents managing program. A GUI (Graphical User Interface) unit 101, in response to operation of the keyboard 18 or mouse 19 by the user, supplies a music piece title corresponding to contents which the user desires or a file name of a file where the contents are stored, to a music piece managing unit 104, and also requests registration of data corresponding to the contents, to a database 107.

The GUI unit 101 obtains data relating to the contents, e.g., music piece ID, music piece title, or artist name, from the database 107 via the music piece managing unit 104, and music piece title or rights information and the like from the rights information storing unit 105, and displays text for the music piece ID, music piece title, artist name, etc., and an icon corresponding to the rights information, on the display 20.

The GUI unit 101 obtains data corresponding to the contents, e.g., media contents ID, music piece title, artist name, rights information, etc., stored in the portable devices 5-1 or 5-2 or the memory card 9 from a transfer processing unit 103, and displays text for the music piece title, artist name, etc., and an icon corresponding to the rights information, on the display 20.

In the event that user operations request playing of contents, the GUI unit 101 supplies the music piece ID corresponding to the contents regarding which playing has been requested to a contents managing processing unit 102, and also requests playing of the contents to the contents managing processing unit 102.

In the event that user operations request transfer (checkout, copying, moving, etc.) of contents, the GUI unit 101 supplies the music piece ID corresponding to the contents regarding which transfer has been requested to the transfer processing unit 103, and also requests transfer of the contents to the transfer processing unit 103.

In the event that user operations request importing of contents, the GUI unit 101 supplies the media contents ID corresponding to the contents regarding which importing has been requested to the transfer processing unit 103, and also requests importing of the contents to the transfer processing unit 103.

In the event that playing of contents is requested from the GUI unit 101, the contents managing processing unit 102 supplies the music piece ID corresponding to the contents regarding which playing has been requested to the music piece managing unit 104, and request a file name corresponding to the contents. Upon obtaining the file name from the music piece managing unit 104, the contents managing processing unit 102 obtains the contents from the music piece file storing unit 108-1 or 108-2, via the music piece managing unit 104, file searching unit 106, and database 107.

The contents managing processing unit 102 supplies the obtained contents to a PC (Protected Content) plug-in 109-1 or 109-2.

Upon the contents being supplied from the contents managing processing unit 102, in the event that the contents are not encrypted, the PC plug-in 109-1 decodes the encoded contents, and supplies the audio data to an audio output unit 110-1. Upon the contents being supplied from the contents managing processing unit 102, in the event that the contents are encrypted, the PC plug-in 109-1 decrypts the encrypted contents into plaintext, as well as decoding the encoded contents, and supplies the audio data to the audio output unit 110-1. The audio output unit 110-1 generates audio signals based on the audio data, and outputs audio from the speaker 24.

At the time that contents are supplied from the contents managing processing unit 102, in the event that the contents are not encrypted, the PC plug-in 109-2 decodes the encoded contents, and supplies the audio data to an audio output unit 110-2. Upon the contents being supplied from the contents managing processing unit 102, in the event that the contents are encrypted, the PC plug-in 109-2 decrypts the encrypted contents into plaintext, as well as decoding the encoded contents, and supplies the audio data to the audio output unit 110-2. The audio output unit 110-2 generates audio signals based on the audio data, and outputs audio from the speaker 24.

The user can further additionally install PC plug-ins to the personal computer 1.

In the following description, the PC plug-ins 109-1 and 109-2 will be referred to simply as PC plug-in 109, unless there is the need to distinguish between the individual PC plug-ins 109-1 and 109-2.

Upon a contents transfer request from the GUI unit 101, the transfer processing unit 103 supplies the music piece managing unit 104 with the music piece ID corresponding to the contents regarding which transfer has been requested, as well as requesting the file name corresponding to the contents. The transfer processing unit 103, upon obtaining the file name from the music price managing unit 104, obtains contents corresponding to the file name from the music piece file storing unit 108-1 or 108-2 via the music piece managing unit 104, file searching unit 106, and database 107.

The transfer processing unit 103 supplies the obtained contents to the PD plug-in 111-1 or 111-2.

Upon a contents import request from the GUI unit 101, the transfer processing unit 103 supplies the media contents ID corresponding to the contents regarding which importing has been requested to the memory card plug-in 112, as well as requesting importing of the contents corresponding to the media contents ID. The transfer processing unit 103 obtains the contents to be imported from the memory card plug-in 112 along with the corresponding rights information.

The transfer processing unit 103 supplies the imported contents to the music piece managing unit 104 along with the rights information.

Upon a request from the GUI unit 101 to move contents from the memory card 9 to the personal computer 1, the transfer processing unit 103 supplies the media contents ID corresponding to the contents regarding which moving has been requested to the memory card plug-in 112, as well as requesting moving of the contents corresponding to the media contents ID. The transfer processing unit 103 obtains the contents to be moved from the memory card plug-in 112 along with the corresponding rights information.

The transfer processing unit 103 supplies the moved contents to the music piece managing unit 104 along with the rights information.

At the time of transferring contents to the portable device 5-1, the PD plug-in 111-1 performs mutual verification with the portable device 5-1. In the event that the mutual verification fails, the PD plug-in 111-1 does not transfer contents to the portable device 5-1.

At the time that contents are supplied from the transfer processing unit 103, in the event that the contents are encrypted, the PD plug-in 111-1 supplies the contents along with the data relating to the contents to the portable device 5-1. Upon the contents being supplied from the transfer processing unit 103, in the event that the contents are not encrypted, the PD plug-in 111-1 encrypts the contents, and supplies the encrypted contents along with the data relating to the contents to the portable device 5-1.

Incidentally, the processing for mutual verification may be executed at the point that the portable device 5-1 is connected to the personal computer 1.

At the time of transferring contents to the portable device 5-2, the PD plug-in 111-2 performs mutual verification with the portable device 5-2. In the event that the mutual verification fails, the PD plug-in 111-2 does not transfer contents to the portable device 5-2.

At the time that contents are supplied from the transfer processing unit 103, in the event that the contents are encrypted, the PD plug-in 111-2 supplies the contents along with the data relating to the contents to the portable device 5-2. Upon the contents being supplied from the transfer processing unit 103, in the event that the contents are not encrypted, the PD plug-in 111-2 encrypts the contents, and supplies the encrypted contents along with the data relating to the contents to the portable device 5-2.

Incidentally, the processing for mutual verification may be executed at the point that the portable device 5-2 is connected to the personal computer 1.

The user can further additionally install PD plug-ins to the personal computer 1.

In the following description, the PD plug-ins 111-1 and 111-2 will be referred to simply as PD plug-in 111, unless there is the need to distinguish between the individual PD plug-ins 111-1 or 111-2.

Upon a contents import request from the transfer processing unit 103, the memory card plug-in 112 reads the contents corresponding to the media contents ID from the memory card 9, along with the corresponding rights information. The memory card plug-in 112 supplies the read contents to the transfer processing unit 103 along with the rights information.

Upon a request from the transfer processing unit 103 to move contents, the memory card plug-in 112 reads the contents corresponding to the media contents ID out from the memory card 9, along with the corresponding rights information. The memory card plug-in 112 supplies the contents read out and the rights information to the transfer processing unit 103.

The music piece managing unit 104 records data in the database 107, such as the music piece title, file name corresponding to the contents, etc., and reads out the music piece title, file name, etc., from the database 107. Upon receiving the music piece title or file name from the GUI unit 101, the music piece managing unit 104 adds a record to the database 107, and records the music piece title or file name as a record item.

Upon being supplied with the contents to be imported and the rights information from the transfer processing unit 103, the music piece managing unit 104 records data such as the music piece title, file name corresponding to the contents, etc., and also records the contents in the music piece file storing unit 108-1 or 108-2. The music piece managing unit 104 generates new rights information based on the rights information supplied corresponding to the imported contents, and records the newly-generated rights information in the rights information storing unit 105. At this time, the rights information generated at the music piece managing unit 104 makes record to the effect that only check-in or check-out is permitted.

Upon being supplied with the contents to be moved and the rights information from the transfer processing unit 103, the music piece managing unit 104 records data such as the music piece title, file name corresponding to the contents, etc., and also records the contents in the music piece file storing unit 108-1 or 108-2. The music piece managing unit 104 records the rights information supplied corresponding to the contents being imported, in the rights information storing unit 105.

In response to a request from the GUI unit 101, the music piece managing unit 104 reads out all music piece titles and music piece IDs or the like recorded in the database 107 and supplies these to the GUI unit 101.

Upon the music piece ID being supplied from the contents managing processing unit 102, the music piece managing unit 104 reads the file name corresponding to the music piece ID from the database 107, and supplies the file name that has been read out to the contents managing processing unit 102. Upon the music piece ID being supplied from the transfer processing unit 103, the music piece managing unit 104 reads out the file name corresponding to the music piece ID from the database 107, and supplies the file name that has been read out to the transfer processing unit 103.

In response to a request from the music piece managing unit 104, the file searching unit 106 searches for a file (storing the contents) corresponding to the file name from the music piece file storing unit 108-1 or 108-2, based on the file name obtained from the database 107. The file searching unit 106 either supplies the file read out from the music piece file storing unit 108-1 or 108-2 to the music piece managing unit 104, or changes the file name of the file and supplies the file with the changed file name to the music piece managing unit 104.

The music piece managing unit 104 supplies the file storing the contents supplied from the file searching unit 106 to the contents managing processing unit 102 or the transfer processing unit 103.

The database 107 records data relating to the contents, such as, for example, the music piece ID, music piece title, file name, and other attributes. The database 107 is stored in the HDD 21.

The music piece file storing unit 108-1 is configured of, for example, the HDD 21 or an unshown external storing device such as a removable disk device or the like, and stores contents as files. Some of the contents recorded in the music piece file storing unit 108-1 have rights information, others do not have rights information. The music piece file storing unit 108-1 can store one or more files corresponding to a music piece. The music piece file storing unit 108-1 corresponds to, for example, one drive letter. There are cases wherein the drive letter corresponding to the music piece file storing unit 108-1 is changed.

The music piece file storing unit 108-2 is configured of, for example, the HDD 21 or an unshown external storing device such as a removable disk device or the like, and stores contents as files. Some of the contents recorded in the music piece file storing unit 108-2 have rights information, others do not have rights information. The music piece file storing unit 108-2 can store one or more files corresponding to a music piece. The music piece file storing unit 108-2 corresponds to, for example, one drive letter. There are cases wherein the drive letter corresponding to the music piece file storing unit 108-2 is changed.

There are cases wherein one or more files corresponding to a music piece are recorded in the music piece file storing unit 108-1, and wherein more files corresponding to that music piece are recorded in the music piece file storing unit 108-2.

Figure 4:
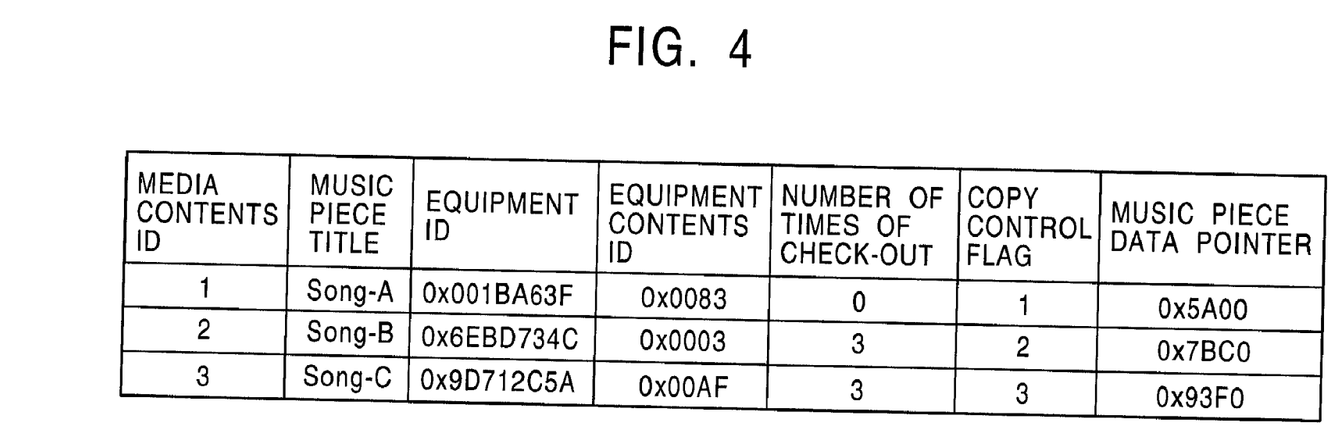
FIG. 4 is a diagram illustrating an example of rights information stored in the memory card 9.

FIG. 4 is a diagram illustrating an example of rights information recorded in the memory card 9, corresponding to the contents recorded in the memory card 9. The rights information recorded in the memory card 9 are configured of, for example, the media contents ID, music piece title, equipment ID, equipment contents ID, the number of times of check-out, copy control flag, and music piece data pointer, etc.

The media contents ID is an identifier having a unique value for each music piece, in a manner uniquely corresponding to each music piece in the memory card 9. The music piece title is the title of the music piece.

The equipment ID is one of the following: the ID of the equipment which performed check-out of the contents, the ID of the equipment which moved the contents, or the ID of the equipment which stored the contents. For example, in the event that there has been check-out of the contents, the equipment ID indicates the ID of the equipment which performed the check-out of the contents. In the event that the contents have been moved and stored, the equipment ID indicates the ID of the equipment which moved the contents. In the event that the contents are imported, the equipment ID indicates the ID of the equipment which stored the contents.

The equipment contents ID is an identifier having a unique value for each music piece within the equipment which performed check-out of the contents, the equipment which moved the contents, or the equipment which stored the contents.

The number of times of check-out indicates the number of times of check-out which can be made for the contents. In the event that the number of times of check-out is set at "−1", the number of times of that check-out can be made for the contents is unlimited.

The copy control flag indicates the operations permitted regarding the contents. For example, in the event that the copy control flag is "1", the equipment which performed check-out of the contents is permitted to check-in the contents. In the event that the copy control flag is "2", moving of the contents is permitted. In the event that the copy control flag is "3", importing of the contents is permitted. Copy control information of "0" indicates that it is invalid.

The music piece data pointer indicates the leading address where the contents are stored in the memory card 9.

In the example shown in FIG. 4, the contents wherein the media contents ID is 1 has a music piece title of "Song-A", equipment ID of "0x001BA63F", equipment contents ID of "0x0083", number of times of check-out of "0", copy control information of "1", and the music piece data pointer thereof is "0x5A00". Accordingly, the contents wherein the media contents ID is "1" is permitted to be checked-in to equipment wherein the equipment ID is "0x001BA63F". The contents wherein the media contents ID is "1" is not permitted to be checked-in to any equipment other than that wherein the equipment ID is "0x001BA63F".

The contents wherein the media contents ID is 2 has a music piece title of "Song-B", equipment ID of "0x6EBD734C", equipment contents ID of "0x0003", number of times of check-out of "3", copy control information of "2", and the music piece data pointer thereof is "0x7BC0". Accordingly, the contents wherein the media contents ID is "2" is moved from equipment wherein the equipment ID is "0x6EBD734C", and moving is permitted.

The contents wherein the media contents ID is 3 has a music piece title of "Song-C", equipment ID of "0x9D712C5A", equipment contents ID of "0x00AF", number of times of check-out of "3", copy control information of "3", and the music piece data pointer thereof is "0x93F0". Accordingly, the contents wherein the media contents ID is "3" is stored by equipment wherein the equipment ID is "0x9D712C5A", and importing is permitted.

Figure 5:
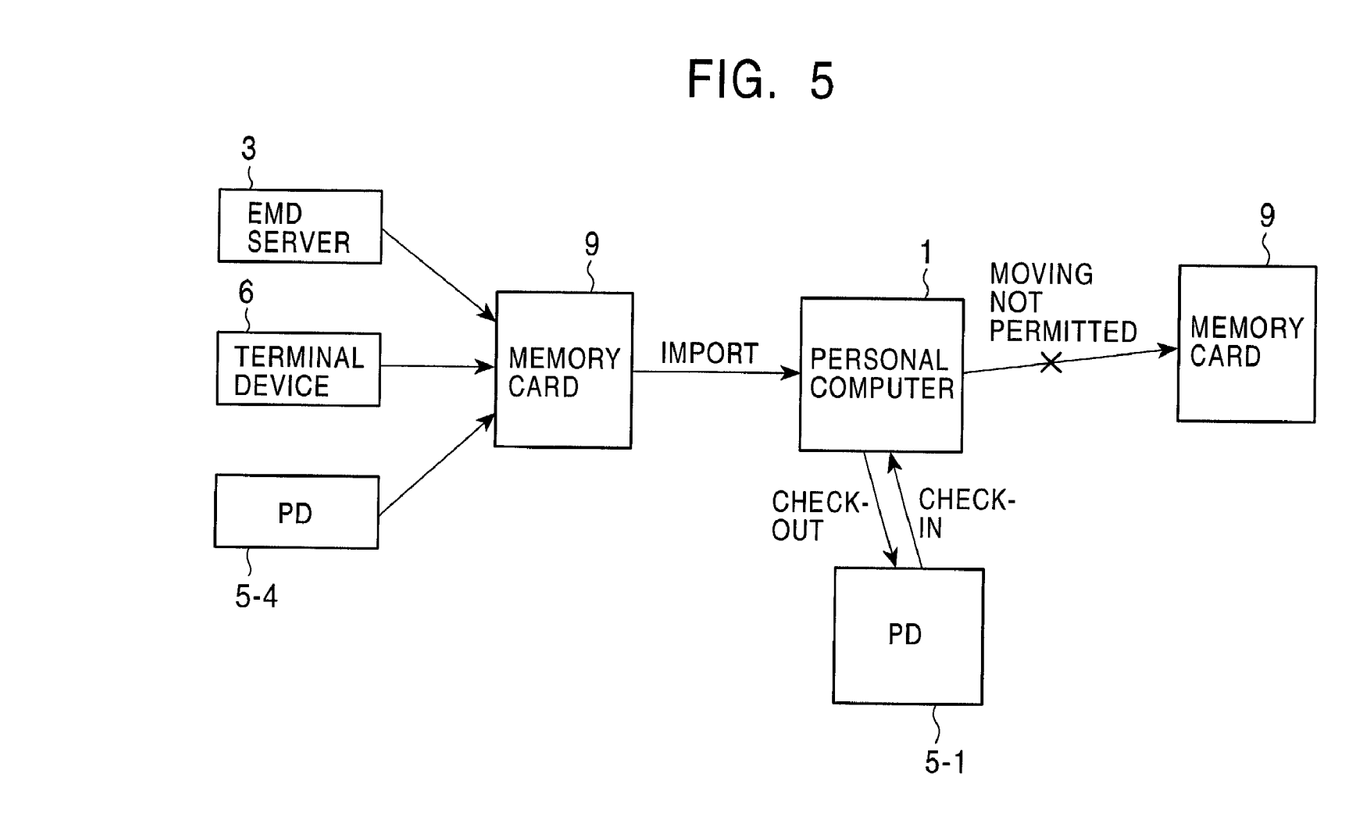
FIG. 5 is a diagram illustrating importing.

Importing contents will be described with reference to FIG. 5.

The memory card 9 stores importing-permitted contents stored from an EMD server 3, terminal device 6, or portable device 5-4.

In the event that contents regarding which importing is permitted are imported to the personal computer 1 from the memory card 9, the contents imported to the personal computer 1 are permitted for check-out to the portable device 5-1, for example following which check-in is made from the portable device 5-1. However, moving the contents imported to the personal computer 1 to the memory card 9 is not permitted.

Figure 6:
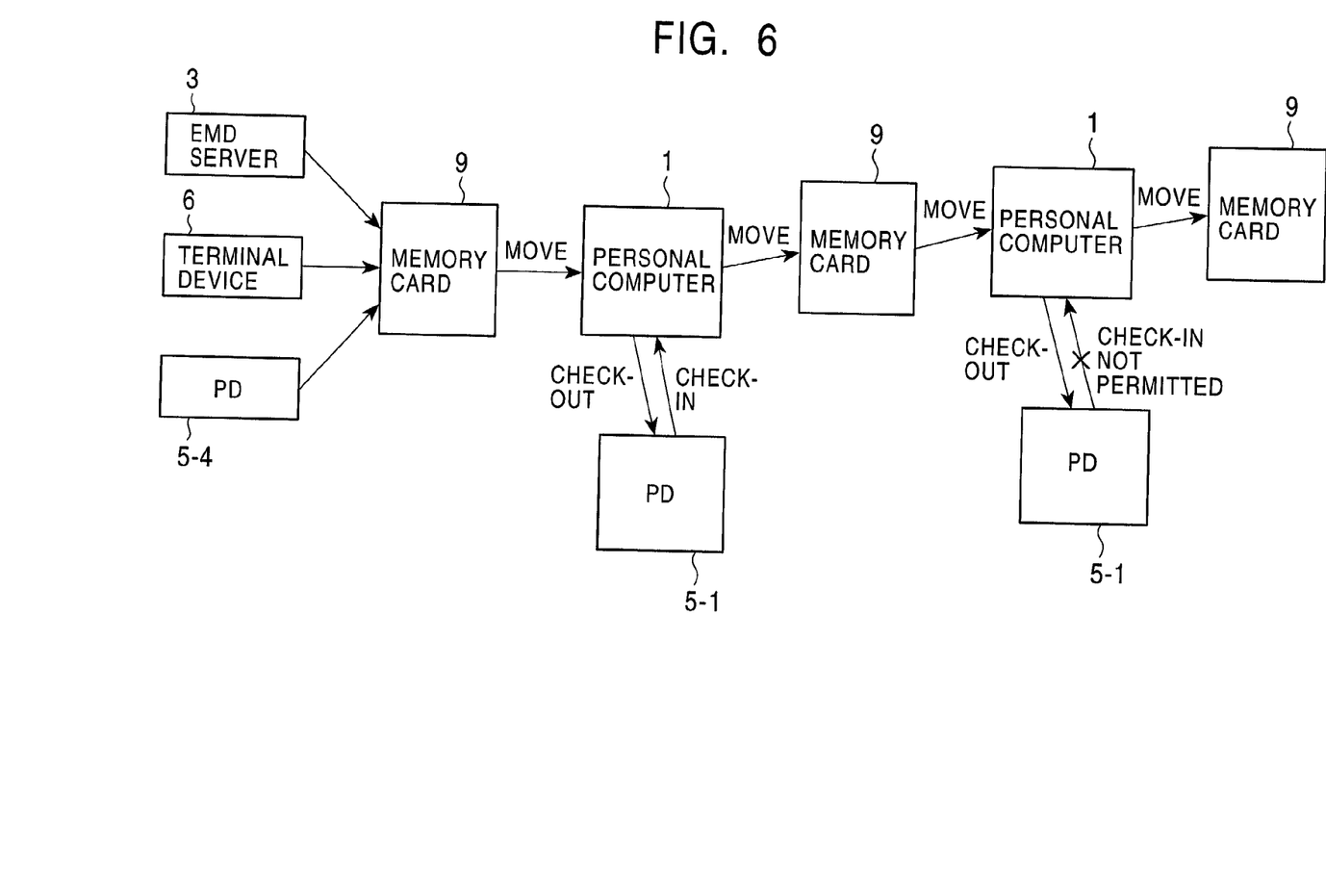
FIG. 6 is a diagram illustrating moving.

Moving contents will be described with reference to FIG. 6.

The memory card 9 stores moving-permitted contents stored from an EMD server 3, terminal device 6, or portable device 5-4.

In the event that contents regarding which moving is permitted are moved to the personal computer 1 from the memory card 9, the contents moved to the personal computer 1 are permitted for check-out to the portable device 5-1, for example following which check-in is made from the portable device 5-1.

Moving the contents moved to the personal computer 1 on to the memory card 9 is permitted. Further, moving the contents moved to the memory card 9 on to the personal computer 1 is permitted.

However, in the event that contents are moved to the memory card 9 following check-out to the portable device 5-1, the contents stored in the portable device 5-1 are not permitted to be checked-in to the personal computer 1.

Figure 7:
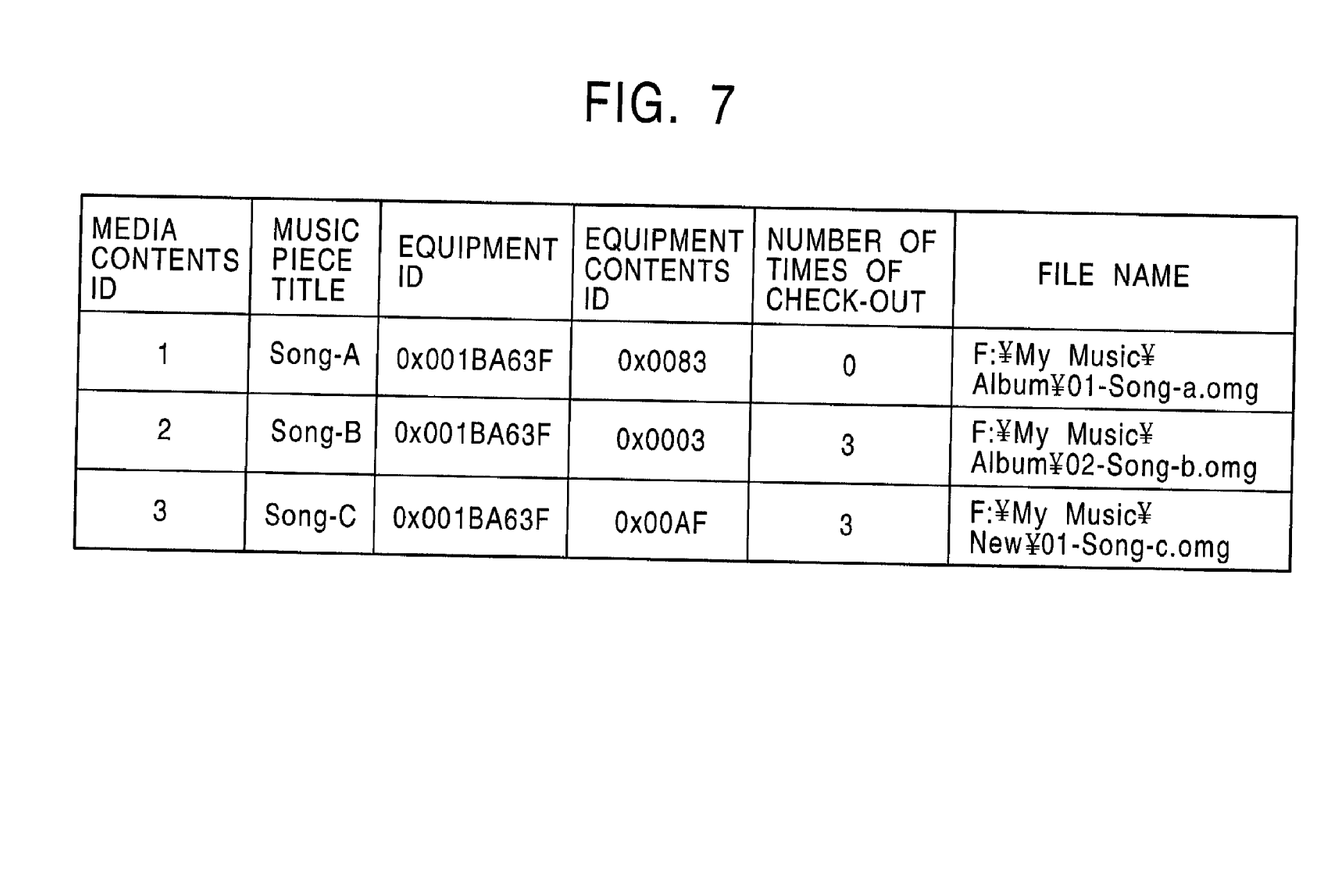
FIG. 7 is a diagram illustrating an example of rights information recorded in the personal computer 1.

FIG. 7 is a diagram illustrating an example of rights information stored in the personal computer 1, corresponding to the contents stored in the rights information storing unit 105. The rights information stored in the personal computer 1 is configured of, for example, the media contents ID, music piece title, equipment ID, equipment contents ID, the number of times of check-out, the file name, and so forth.

The media contents ID is an identifier having a unique value for each music piece, in a manner uniquely corresponding to each music piece, within a recording medium for the personal computer 1, e.g., the HDD 21. The music piece title indicates the title of the music piece.

The equipment ID indicates the ID of the personal computer 1.

The equipment contents ID is an identifier having a unique value for each music piece within the personal computer 1.

The number of times of check-out indicates the number of times of check-out which can be made for the contents. In the event that the number of times of check-out is set at "−1", the number of times of that check-out can be made for the contents is unlimited.

The file name is a file name containing a path made up of, for example, a drive name and a folder name. The rights information storing unit 105 stores the name of the file where the contents are stored (stored in the music piece file storing unit 108-1 or 108-2) at the point that the contents are registered (either the point that the contents are stored, or the point that data relating to the contents is registered in the database 107) as the file name thereof.

In the example shown in FIG. 7, the contents wherein the media contents ID is 1 has a music piece title of "Song-A", an equipment ID of "0x001BA63F", an equipment contents ID of "0x0083", the number of times of check-out of "0", and the file name of thereof is "F:¥MyMusic¥Album¥01-Song-a.omg". The contents wherein the media contents ID is 2 has a music piece title of "Song-B", an equipment ID of "0x001BA63F", an equipment contents ID of "0x0003", the number of times of check-out of "3", and the file name of thereof is "F:¥MyMusic¥Album¥02-Song-b.omg". The contents wherein the media contents ID is 3 has a music piece title of "Song-C", an equipment ID of "0x001BA63F", an equipment contents ID of "0x00AF", the number of times of check-out of "3", and the file name of thereof is "F:¥MyMusic¥New¥01-Song-c.omg".

Figure 8:
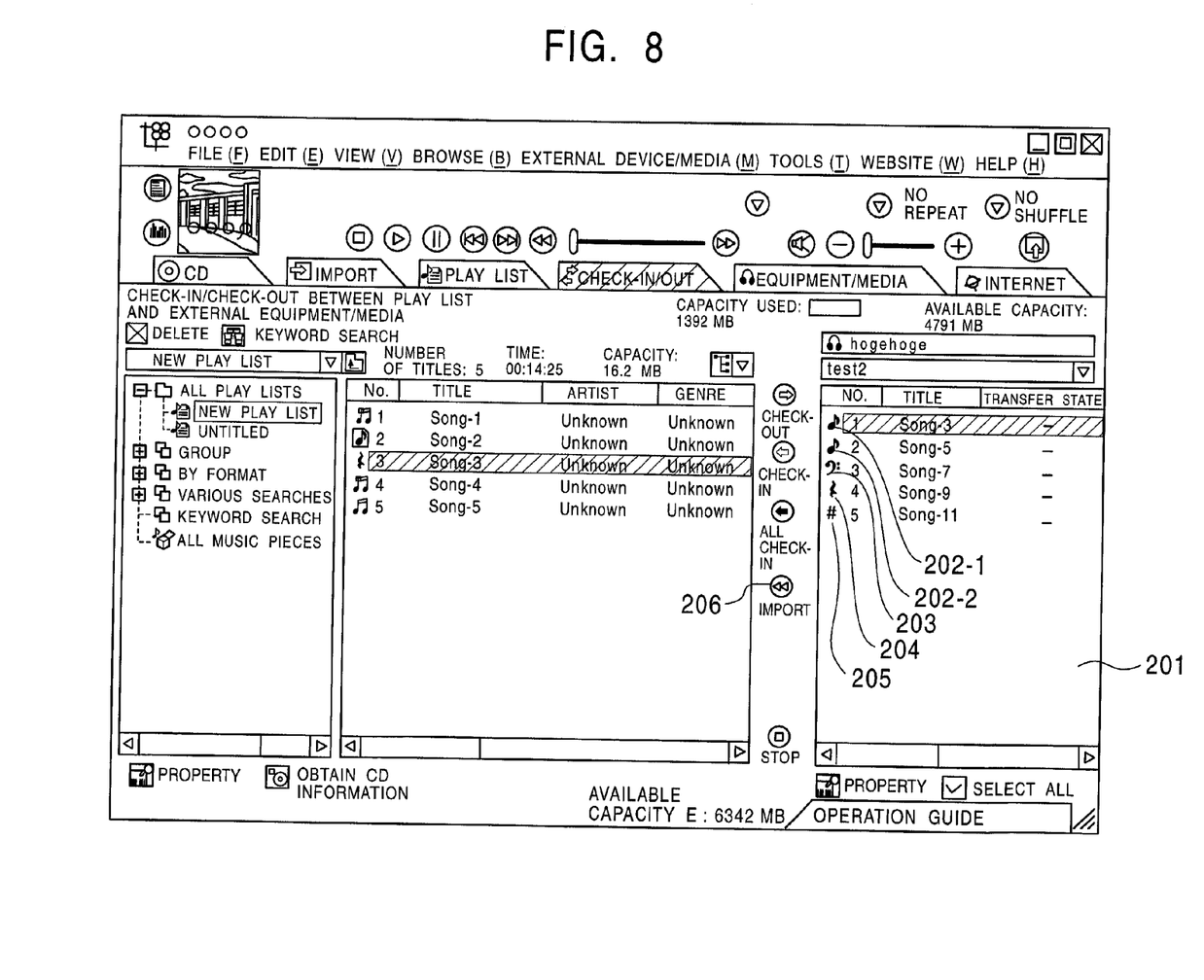
FIG. 8 is a diagram describing an icon corresponding to rights information.

Description will be made regarding the icons corresponding to the rights information which are displayed on the display 20 by the GUI unit 101, with reference to the example shown in FIGS. 8 and 9.

The GUI unit 101 displays on the display 20 a window containing a field 201 for displaying music piece titles and the like corresponding to the contents stored in the memory card 9.

In the event that the copy control flag corresponding to the contents stored in the memory card 9 is "1", and the equipment ID corresponding to the contents stored in the memory card 9 is the same as the equipment ID of the personal computer 1, this means that check-in is permitted for the contents, so the GUI unit 101 displays in the field 201 an icon 202-1 or 202-2 (e.g., an eighth note icon) indicating that check-in is permitted, in a manner corresponding to the music piece title or the like of the contents.

Figure 9A:
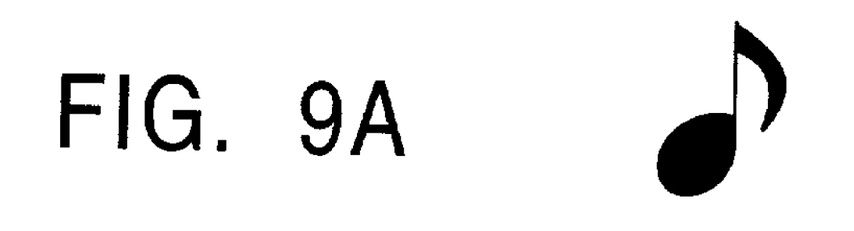
FIGS. 9A–9D are diagrams describing an icon corresponding to rights information.

FIG. 9A is a drawing illustrating the icon 202-1 or 202-2. In the following description, the icons 202-1 and 202-2 will be referred to simply as icon 202, unless there is the need to distinguish between the individual icons 202-1 and 202-2.

In the event that the copy control flag corresponding to the contents stored in the memory card 9 is "3", this means that importing is permitted for the contents, so the GUI unit 101 displays in the field 201 an icon 203 (e.g., a bass clef icon) indicating that importing is permitted, in a manner corresponding to the music piece title or the like of the contents.

Figure 9B:
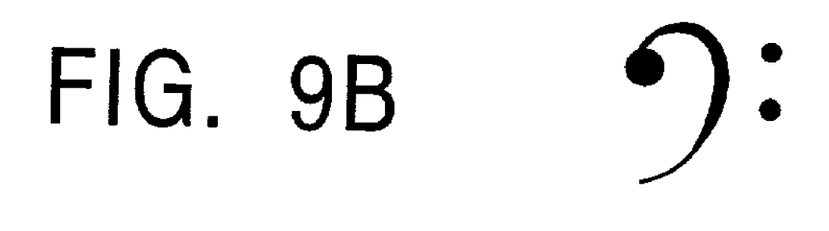

FIG. 9B is a drawing illustrating the icon 203.

In the event that the copy control flag corresponding to the contents stored in the memory card 9 is "1", and the equipment ID corresponding to the contents stored in the memory card 9 is not the same as the equipment ID of the personal computer 1, this means that check-in is not permitted for the contents, so the GUI unit 101 displays in the field 201 an icon 204 (e.g., a quarter rest icon) indicating that check-in is not permitted, in a manner corresponding to the music piece title or the like of the contents.

Figure 9C:
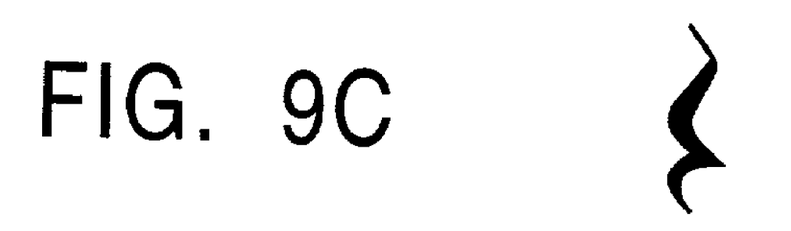

FIG. 9C is a drawing illustrating the icon 204.

In the event that the copy control flag corresponding to the contents stored in the memory card 9 is "2", this means that moving is permitted for the contents, so the GUI unit 101 displays in the field 201 an icon 205 (e.g., a sharp icon) indicating that moving is permitted, in a manner corresponding to the music piece title or the like of the contents.

Figure 9D:
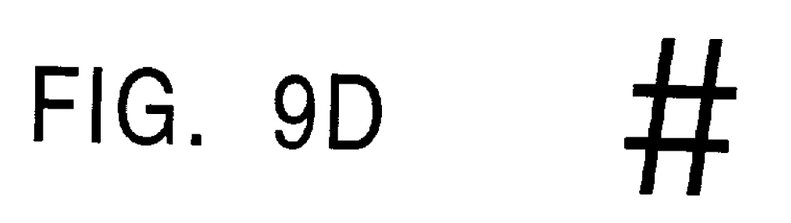

FIG. 9D is a drawing illustrating the icon 205.

In the event that contents regarding which importing are selected, i.e., in the event that contents with the icon 203 are selected and the button 206 is clicked, the GUI unit 101 makes a request to the transfer processing unit 103 to import corresponding contents.

Figure 10:
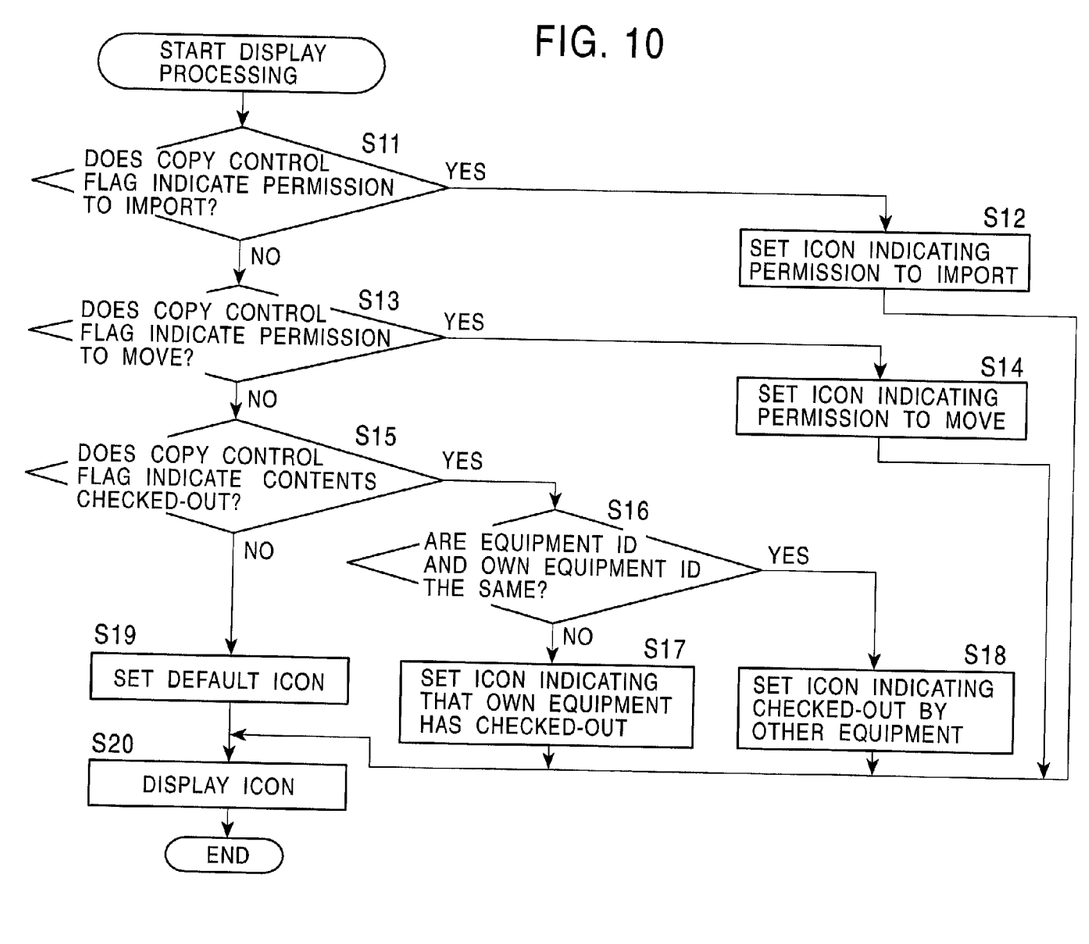
FIG. 10 is a flowchart describing the processing for displaying an icon with the GUI unit 101.

Next, the processing for displaying icons with the GUI unit 101 will be described with reference to the flowchart shown in FIG. 10.

In step S11, the GUI unit 101 judges whether or not the copy control flag contained in the rights information read out from the memory card 9 via the memory card plug-in 112 and the transfer processing unit 103 indicates permission to import, and in the event that judgment is made that the copy control flag indicates permission to import, the flow proceeds to step S12, the icon 203 indicating permission to import is set, and the flow proceeds to step S20.

In step S11, in the event that the GUI unit 101 judges that the copy control flag does not indicate permission to import, the flow proceeds to step S13, wherein the GUI unit 101 judges whether or not the copy control flag contained in the rights information indicates permission to move, and in the event that judgment is made that the copy control flag indicates permission to move, the flow proceeds to step S14, the icon 205 indicating permission to move is set, and the flow proceeds to step S20.

In step S13, in the event that the GUI unit 101 judges that the copy control flag does not indicate permission to move, the flow proceeds to step S15, wherein the GUI unit 101 judges whether or not the copy control flag contained in the rights information indicates checked-out contents, and in the event that judgment is made that the copy control flag indicates checked-out contents, the flow proceeds to step S16.

In step S16, the GUI unit 101 judges whether or not the equipment ID contained in the rights information is the same as its own equipment ID, and in the event that judgment is made that the equipment ID contained in the rights information is the same as its own equipment ID, the flow proceeds to step S17, an icon indicating own check-out, i.e., the icon 202 indicating permission to check-in is set, and the flow proceeds to step S20.

In the event that judgment is made in step S16 that the equipment ID contained in the rights information is not the same as its own equipment ID, the flow proceeds to step S18, an icon indicating check-out from other equipment, i.e., the GUI unit 101 sets the icon 204 indicating that check-in is not permitted, and the flow proceeds to step S20.

In step S15, in the event that the GUI unit 101 judges that the copy control flag does not indicate checked-out contents, the flow proceeds to step S19, a default icon (an icon other than any of the icons 202, 203, 204, or 205) is set, and the flow proceeds to step S20.

In step S20, the GUI unit 101 displays the set icon, and the processing ends.

Thus, the GUI unit 101 displays icons corresponding to the copy control flag contained in the rights information read out from the memory card 9, the user can speedily know operations which are permitted regarding the contents.

Now, while the contents have been described as being music data, the contents may be data such as moving images, still images, numerical values, or may be programs or the like.

Also, description has been made with reference to an arrangement wherein the personal computer 1 reads out rights information from a memory card 9 and displays an icon, but the present invention is not restricted to a memory card 9; rather, rights information may be read out of portable devices 5, cellular telephones, portable video cassette recorders with picture-taking functions, portable personal computers, PDAs, and so forth, which store contents, whereby an icon is displayed.

Further, description has been made with reference to an arrangement wherein the personal computer 1 imports or transfers contents from a portable device, but the present invention is not restricted to a portable device; rather, contents may be imported or transferred from recording mediums such as magnetic disks, optical disks, magneto-optical disks, and so forth.

While the above series of processes can be executed by hardware, this can also be executed by software. In the event of executing the series of processes by software, the program making up the software is provided in dedicated hardware which is assembled into a computer, or is installed to, for example, a general-purpose personal computer, capable of executing various functions by installing various types of programs, from a program storing medium.

A program storing medium which stores the program to be installed in a computer so as to enable the computer to execute the program comprises, as shown in FIG. 2, packaged media such as magnetic disks 41 (including floppy disks), optical disks 42 (CD-ROMs (Compact Disk Read-Only Memory)), DVDs (Digital Versatile Disks), magneto-optical disks 43 (including MDs (Mini-Disks)), or semiconductor memory 44 or the like, or ROM 12 or a HDD 21 where the program is temporarily or permanently stored. Storing of the program to the program storing medium is performed using online or wireless communication media such as a Local Area Network, the Internet, digital satellite broadcasting, etc., via an interface such as a router or modem, as necessary.

In the present specification, the steps describing the programs stored in the program storing medium may of course be executed in the time sequence following the order in which they are listed, but are not restricted to being executed in this time sequence, and may be executed in parallel or individually.

Also, in the present specification, the term "system" represents all equipment made up of multiple devices.

With the information processing apparatus according to the first aspect, the information processing method according to the second aspect, and the program storing medium according to the third aspect, reading of data relating to contents and rights information corresponding to contents from a recording medium is controlled, and in the event that the rights information indicates permission to import contents, display is controlled so as to display a first icon in accordance with the data, so the user can speedily know operations which are permitted regarding the contents, without troublesome operations.

What is claimed is:

1. An information processing apparatus for operating contents, said apparatus comprising:
    a contents obtaining unit for obtaining contents and rights information, the rights information including a set of rights, each right associated with a specific content, an equipment identifier and a control flag which indicates a set of permitted operations associated with a set of specific contents;
    a setting unit for setting an icon chosen among a set of icons corresponding to the control flag from different forms of icons among the set of icons representative of said permitted operations and the equipment identifier; and
    a display for displaying the icon set by said setting unit; wherein the icon indicates rights associated with the content.

2. The information processing apparatus according to claim 1,
    wherein said setting unit sets a second icon when said control flag indicates permission of importing the contents.

3. The information processing apparatus according to claim 1,
    wherein said setting unit sets a third icon when said rights information indicates permission of check-in of said contents; and
    wherein the display displays the third icon.

4. The information processing apparatus according to claim 1,
    wherein said setting unit sets a fourth icon when said rights information indicates permission of moving of said contents; and
    wherein the display displays the fourth icon.

5. The information processing apparatus according to claim 1,
    wherein said setting unit sets a fifth icon when said rights information indicates forbidding of check-in of said contents; and
    wherein the display displays the fifth icon.

6. An information processing method for operating contents, said method comprising:
    a contents obtaining step of obtaining contents and rights information, the rights information including a set of rights, each right associated with a specific content, an equipment identifier and a control flag which indicates a set of permitted operations associated with a set of specific contents;
    a setting step of setting an icon chosen among a set of icons corresponding to the control flag from different forms of icons among the set of icons representative of said permitted operations and the equipment identifier; and
    a display step of displaying the icon set in said setting step;
    wherein the icon indicates rights associated with the content.

7. The information processing method for operating contents according to claim 6, further comprising:
    setting a second icon when said rights information indicates permission of check-in of said contents; and
    displaying the second icon.

8. The information processing method for operating contents according to claim 6, further comprising:
    setting a third icon when said rights information indicates permission of moving of said contents; and
    displaying the third icon.

9. The information processing method for operating contents according to claim 6, further comprising:
    setting a fourth icon when said rights information indicates forbidding of check-in of said contents; and
    displaying the fourth icon.

10. A program stored in a computer readable medium, said program comprising:
    code for obtaining contents and rights information, the rights information including a set of rights, each right associated with a specific content, an equipment identifier and a control flag which indicates a set of permitted operations associated with a set of specific contents;
    code for setting an icon chosen among a set of icons corresponding to the control flag from different forms of icons among the set of icons representative of said permitted operations and the equipment identifier; and
    code for displaying the icon set by the setting code;
    wherein the icon indicates rights associated with the content.

* * * * *